(Model.)
J. W. WILSON.
CULTIVATOR.
No. 269,362. Patented Dec. 19, 1882.
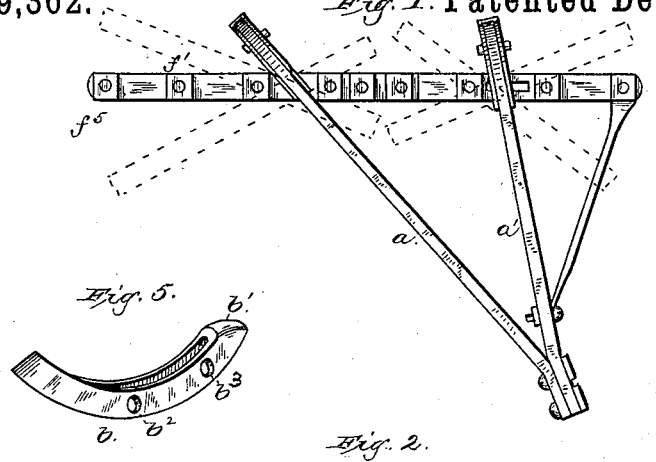
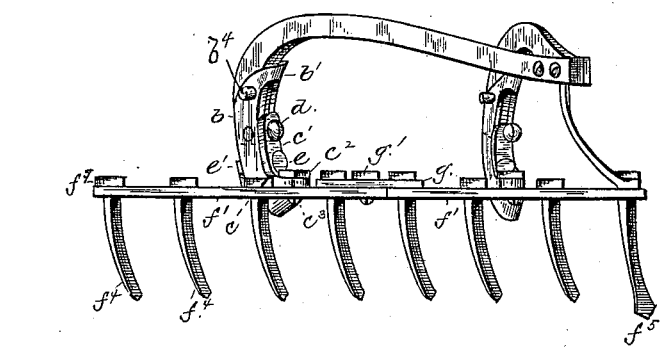
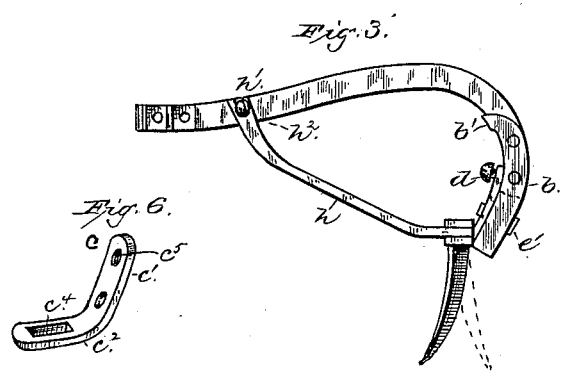
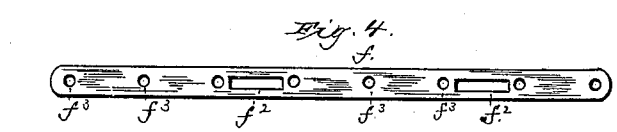
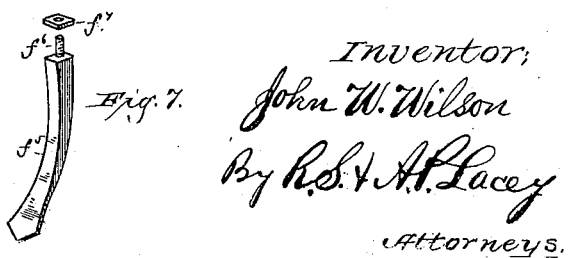
Witnesses
J. E. Clark.
P. B. Turpin.
Inventor:
John W. Wilson
By R. S. & A. P. Lacey
Attorneys.

UNITED STATES PATENT OFFICE.

JOHN W. WILSON, OF ASHMORE, ILLINOIS.

CULTIVATOR.

SPECIFICATION forming part of Letters Patent No. 269,362, dated December 19, 1882.

Application filed August 3, 1882. (Model.)

*To all whom it may concern:*

Be it known that I, JOHN W. WILSON, a citizen of the United States, residing at Ashmore, in the county of Coles and State of Illinois, have invented certain new and useful Improvements in Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has relation to improvements in cultivators, corn harrows, and similar implements; and it consists in the construction and arrangement of the several parts, as will be hereinafter fully described, and specifically pointed out in the claims.

In the drawings, Figure 1 is a plan view, Fig. 2 is a front elevation, Fig. 3 is a side view, and Figs. 4, 5, 6, and 7 are detail views, of a device constructed according to my invention, as will be described.

$a$ $a'$ represent ordinary shovel or cultivator beams. The beam $a$ is made longer than the beam $a'$ in order to secure the toothed bar at an angle to the direction of the beams. These beams are connected at their forward ends, and near their rear end I cut two bolt-holes for the purpose of receiving the bolts which secure the loop-connection and the beams together.

$b$ represents the loop-connection. Its upper end, $b'$, is bent forward to bear against the forward side of the standard of the beam, as shown in Figs. 2 and 3, and it is provided with holes $b^2$ $b^3$, whereby it is secured by bolts or pins to the standard. The loop is substantially pivoted to the standard by a strong pin placed through the hole $b^2$, and its upper end is held to the standard by a wooden pin, $b^4$, placed through the hole $b^3$ and a coincident one in the standard. Thus when the harrowing-teeth come in contact with any immovable obstruction this wooden pin will break and the loop carrying the toothed bar will swing back and escape over the obstruction, when the upper end of the loop may again be secured by another wooden pin, a number of which may be carried when bad ground is being prepared. The lower end of the loop extends below the end of the beam and provides a slot in which the bolt securing the knee may be adjusted to set the latter higher or lower, as may be desired.

It will be understood that by bifurcating the lower end of the beam, and thus providing a vertical opening, or forming it with a slot, good result would be accomplished; but I prefer the use of the loop, as shown, as by it I gain better results, and also the parts can be more readily and cheaply repaired in case of breakage.

$c$ represents the knee securing the toothed bar and the connecting-loop. It is bent to provide the arms $c'$ $c^2$. The arm $c'$ is provided with two bolt-holes, the upper one of which is threaded to receive the threaded set-screw $d$, while the lower one admits the bolt $e$, the head of which bears against the arm $c'$, and it is extended through the knee and the opening in lower end of loop-connection $b$, and is secured by nut $e'$, screwed on the end of the bolt $e$, and bearing against the rear of the connection $b$, as shown. By loosening the nut $e'$ the knee may be adjusted up or down in the connection $b$, as may be desired. The set-screw turns in a threaded opening, $c^5$, in the knee $c$ and bears against the beam, and by turning this screw the knee may be set to adjust the teeth to any desired pitch, the bar being braced by the brace-rod having its forward end slotted, as will be described. Through the arm $c^2$ of the knee I cut a slot, $c^4$, through which is passed the bolt $c^3$, which secures the knee and tooth-bar together. The slot permits an adjustment of bolt $c^3$, which is often desirable.

$f$ represents the tooth-carrying bar. It is made in two sections, $f'$ $f'$, as shown in Figs. 1 and 2, so that the sections, being secured by bolt $c^3$, and thus practically pivoted on the foot of the standard, may be set at different angles and on opposite sides of a row, as shown in dotted lines, Fig. 1, providing a straddle-row cultivator. The teeth being adjustable, as will be described, can be set to work properly with the different draft-angles of the bar, and by removing the section from the longer or rear beam, $a$, and securing a cultivator-shovel thereto, I can harrow next the corn and plow between the rows at the same time. The inner or meeting ends of these sections are made square, and they are connected together by a plate, $g$, lapping the joint, as shown in Fig. 2.

This plate is secured to one section by the shank and nut of one of the teeth, and to the other section by one of the teeth and the bolt $g'$, and the meeting ends being square and abutted closely together, they are firmly held, and form substantially a single bar.

When so desired, the plate $g$ may be made long enough to extend from one to the other of the sections $f'$ when they are turned apart and brace them in their straddle-row positions. When the adjustable sections are not desired the bar may be made in a single piece, as shown in Fig. 4.

$f^2$ are elongated slots cut in the section $f'$, through which are passed the bolts $c^3$, securing the knee and bar together. When the two sections $f'$ are used this slot is advantageous, in that it permits the adjacent ends of the sections to be adjusted to and away from each other, and also to enable the bars to be set at any angle desired on any ordinary cultivator the beams of which are not made of a uniform distance apart, and these slots are used when a single bar is employed to facilitate its connection to cultivators of various widths.

$f^3$ represent bolt-holes formed in the bar $f$, to admit the threaded tangs of the teeth and bull-tooth, hereinafter described.

$f^4$ represent the teeth; $f^5$, the bull-tooth. They are provided at their upper end with round threaded tangs $f^6$, adapted to be placed through the bolt-holes $f^3$ and secured by nuts $f^7$. These teeth are curved forward, as shown, and, being connected by tang and nut, may be readily turned to adjust themselves to the different angles to which the sections of bar $f$ are set, or they may be entirely reversed, so as to curve back, in which position they are often used to great advantage in a corn-field. The teeth and bull-tooth are made thickest at their upper end and gradually diminished toward their lower end. The teeth are made of about an equal width from top to bottom, while the bull-tooth is constructed with its shank about the same width as the teeth, and with its end extended below the end of the teeth and made wider, as shown in Fig. 2. This bull-tongue is arranged at the end of the bar $f$ and runs close to the corn, and, being longer than the other teeth, gives the section a steady run, and by its peculiar shape throws the dirt up better to the corn-row.

$h$ represents a bar having its rear end bolted to outer end of the section $f'$. The forward end of this bar is extended to the cultivator-beam, and is provided with a slot, $h'$, through which is passed the bolt $h^2$, which secures it to the beam. This slot $h'$ is open at its forward end, so that it may pull out from the securing-pin when the toothed section is swung back, as heretofore described. By loosening the bolt $h^2$ the rod $h$ is permitted to be moved forward or back as the bar $f$ is tilted by the set-screw $d$, as has been described.

This invention can readily be adapted and attached to any corn-cultivator, either on wheels or runners, the object being to provide a means whereby to efficiently cultivate corn or vegetables that are planted in hills or drills when small. The tooth-carrying bars, being made in two sections and secured to the beam by knees and loop-connections, as shown, provide a convenient and efficient adjustment and fastening, as described.

Having thus described my invention, what I claim, and desire to secure by Letters Patent, is—

1. In a cultivator and corn-harrow, the combination, substantially as described, of the cultivator-beam, the bar $f$, the brace-rod $h$, having one end secured to outer end of bar $f'$ and its opposite end slotted and connected to the beam, the knee $c$, secured to the bar $f'$ and to the foot of the standard, and the adjusting set-screw $d$, as set forth.

2. The combination, with the diverging beams $a\ a'$, secured together at their forward ends, of the sectional toothed carrying-bar $f$, having the sections $f'\ f'$, secured adjustably to the rear ends of the beams, as and for the purposes set forth.

3. In a cultivating-harrow, the combination, substantially as described and shown, of the diverging beams, connected together at their forward ends, the pivoted connection-loops, having their upper ends secured by a fragile pin, the knees, the adjusting set-screw, the adjustable toothed sections, the connection-plate $g$, and the brace $h$, as and for the purposes set forth.

In testimony whereof I affix my signature in presence of two witnesses.

JOHN W. WILSON.

Witnesses:
THOS. W. HOYNE,
J. L. WOODWORTH.